United States Patent
Kinney

[15] 3,669,269
[45] June 13, 1972

[54] INDUSTRIAL PLANT FOR RECOVERING SOLIDS FROM LIQUIDS

[72] Inventor: Selwyne P. Kinney, Carnegie, Pa.
[73] Assignee: S. P. Kinney Engineers, Inc., Carnegie, Pa.
[22] Filed: July 6, 1970
[21] Appl. No.: 52,580

[52] U.S. Cl..............................210/122, 210/297, 210/392, 210/396
[51] Int. Cl......................................................B01d 50/00
[58] Field of Search..................210/297, 391, 393, 333, 402, 210/396, 397, 392, 122

[56] References Cited

UNITED STATES PATENTS

| | | | |
|---|---|---|---|
| 1,051,160 | 1/1913 | Robacher | 210/396 |
| 2,253,692 | 8/1941 | DeGrave | 210/392 |
| 3,089,325 | 5/1963 | Robbins et al. | 210/333 X |

Primary Examiner—J. L. DeCesare
Attorney—Parmelee, Utzler & Welsh

[57] ABSTRACT

Apparatus for the removal of solids from liquids and concentrating the solids through the use of strainers. Solid-laden water or other liquid is passed through an automatic self-cleaning strainer wherein the strainer media is cleaned by clean water flowing in a reverse direction, relative to the flow of dirty water therethrough. The backwash water is passed through a low pressure rotating screen type strainer assembly where the solids are removed and the clean water returned to the outlet of the self-cleaning strainer. Accumulated solids are continuously removed from the surface of the screens and discharged outside of the strainer assembly.

12 Claims, 6 Drawing Figures

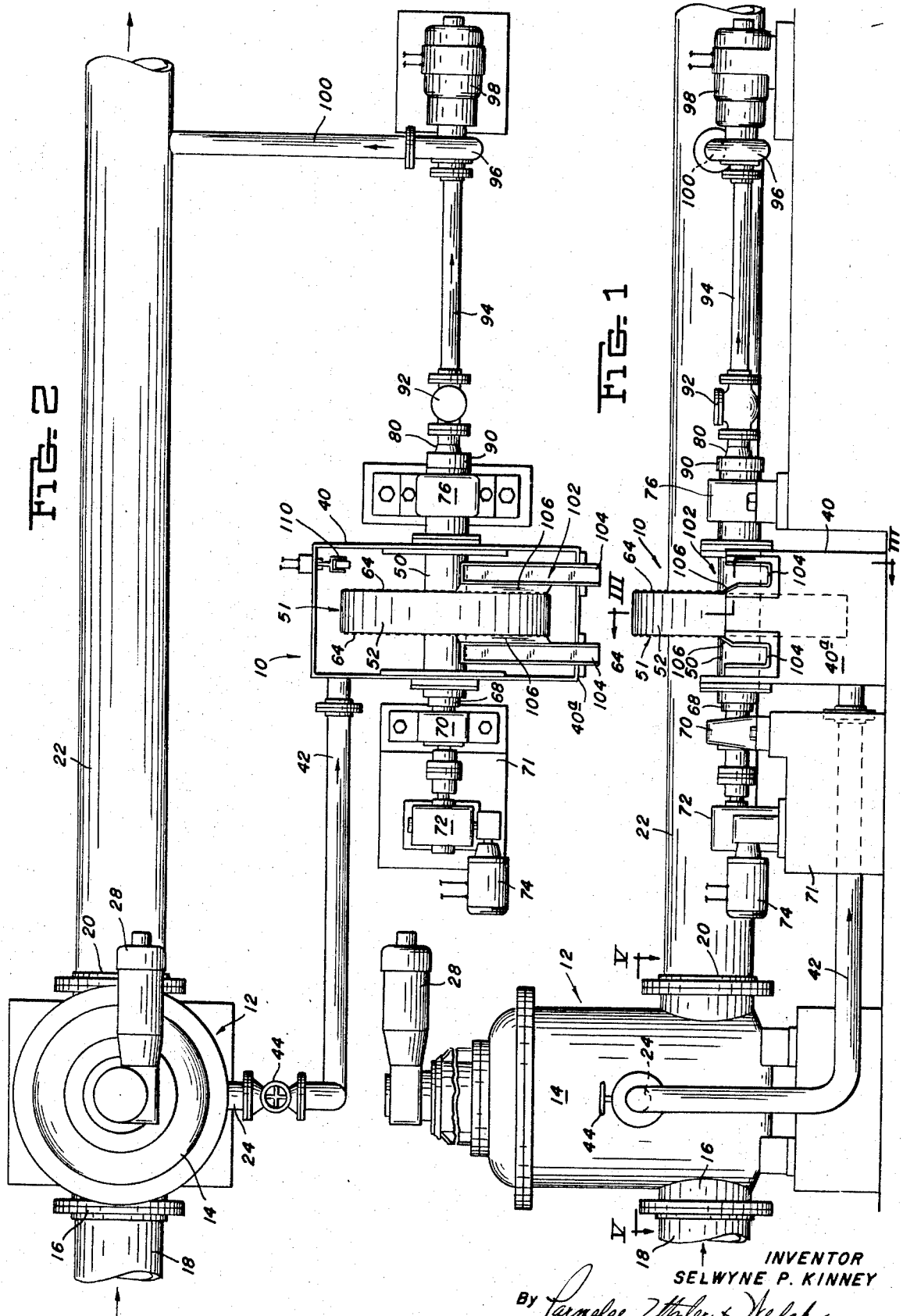

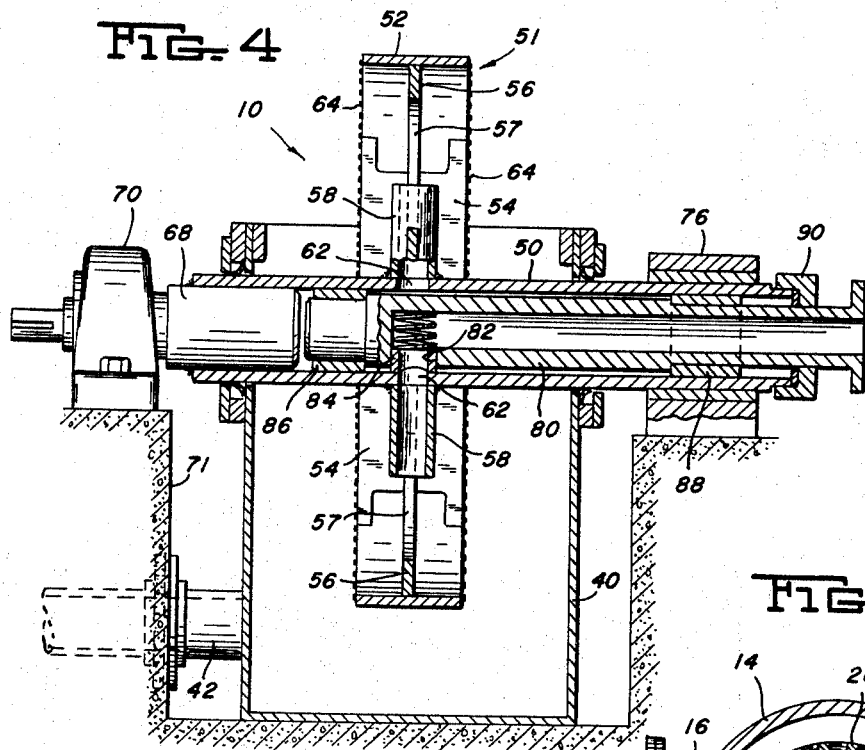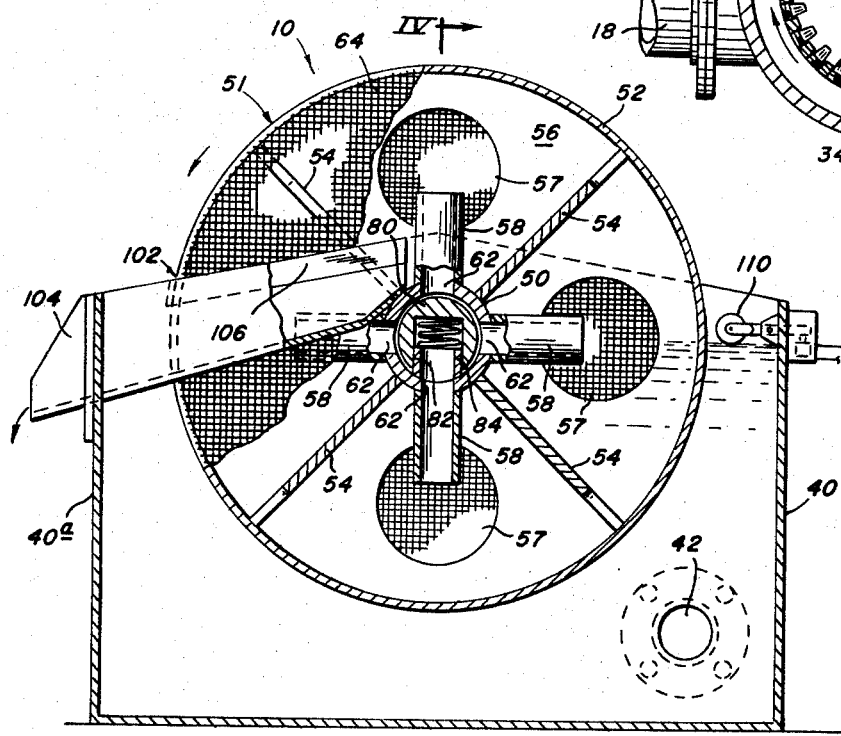

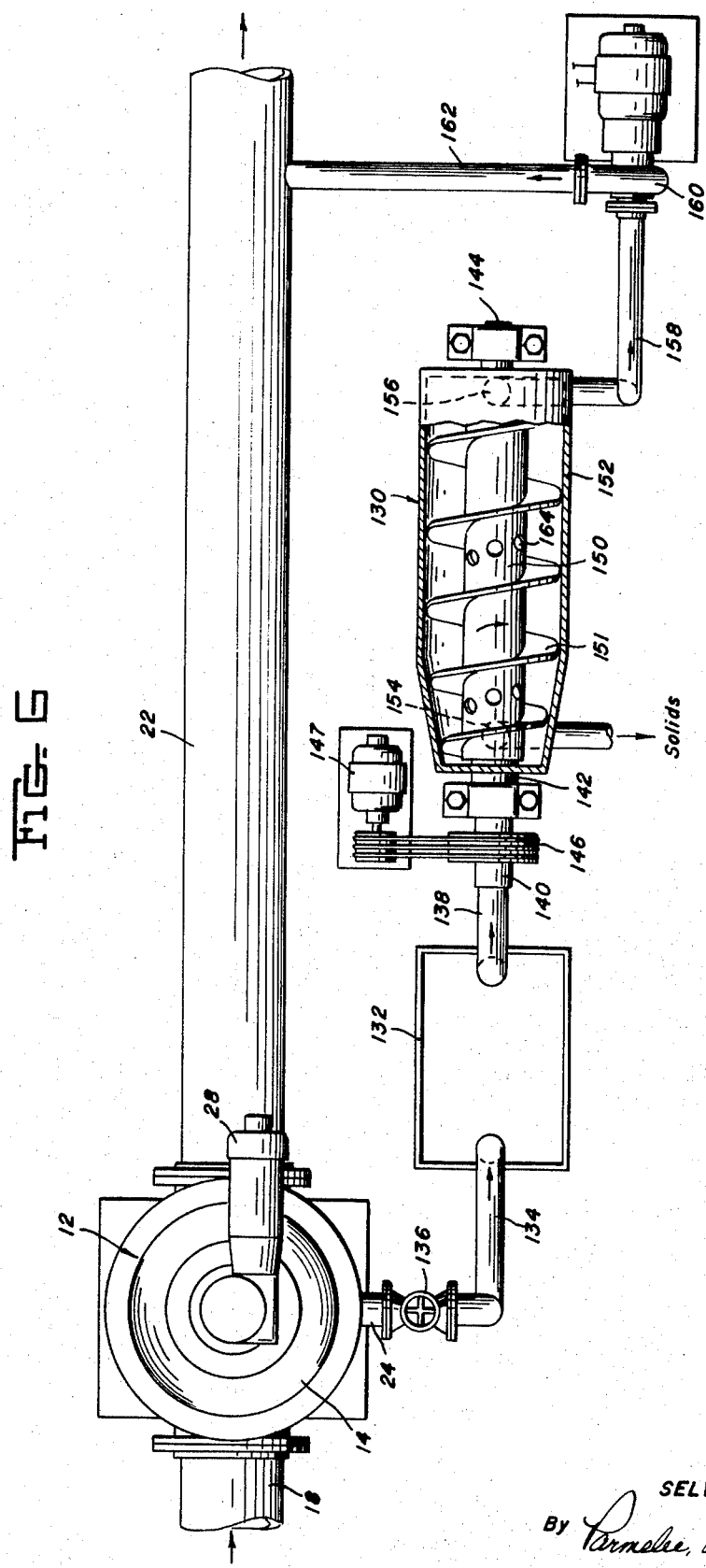

INDUSTRIAL PLANT FOR RECOVERING SOLIDS FROM LIQUIDS

This invention relates to an industrial plant for removing solids from liquids, and more particularly to a backwash liquid strainer assembly for use in combination with an automatic self-cleaning rotating drum strainer.

Automatic self-cleaning strainers, especially drum type, are extensively used in industry for removing solid matter from liquids. Often times they are used for eliminating foreign substances carried in surface water, such as streams or rivers. Typically constructed, these drum strainers include a generally cylindrical housing containing a rotating drum having straining media arranged in openings through the body thereof. Dirty water enters the drum strainer through an inlet port and is diverted through the drum where the heavy solid matter is strained from the water. The clean water is directed from within the drum to an outlet port where it is discharged to be used as needed. As the drum strainer rotates, each vertical column of strainer elements passes between a backwash chamber where clean water flows in reverse direction through that column of strainers to flush away accumulated solids from the outer surface of the strainers. The solid laden backwash water is then discharged from the backwash chamber. The discharged backwash water was either dumped on the ground surface around the drum strainer or into settling tanks, or directed back to the river or stream from where the original water came. It many cases it is desirable to recover the solids from the backwash water for reuse, and also to recover the solids in such a manner that the clean backwash water may be reused. In other cases, the interest is in preventing water pollution and thus in removing solids from the backwash water and discharging the clean water into the rivers or streams from where it originally came. The usual method of removing the solids from the backwash water, for whatever purpose, is to discharge the backwash water into a settling tank which is not a very efficient way of removing solids from liquids. This invention makes possible the efficient removal of solids from backwash liquids. With the present invention, backwash liquid is discharged into a reservoir tank at atmospheric pressure from which it is withdrawn through a low pressure type strainer. The clean liquid is discharged from the strainer to be used as desired. There is also provided means for removing the solids from the surface of the screens and discharging the solids externally of the strainer. This arrangement imposes no back pressure on the backwash system, concentrates the solids, and recovers the liquid that would otherwise be wasted. Furthermore, it eliminates the need for settling tanks and also permits return of clean water to rivers or streams.

More particularly, I provide a plant for the processing of liquids having solids therein, preferably comprising: an automatic self-cleaning rotary strainer; a reservoir tank communicating with the backwash outlet of the rotary strainer for receiving and storing backwash liquid until it is ready to be strained. The tank supports a strainer which includes a liquid inlet communicating with the interior of the tank. For example, I provide a disc-shaped mesh wire strainer having screens supported on the ends of an annular housing which housing is arranged on a hollow shaft coupled to a motor. Inlet pipes are arranged on the shaft between the screens and communicate with the interior of the shaft. Also provided is a suction means extending from the exterior of the reservoir tank to communicate with the liquid inlet of the strainer for drawing liquid from the tank through the strainer and for then discharging the clean liquid externally of the tank. In my preferred embodiment I show a pump coupled through suitable piping communicating with one of the liquid inlet pipes of the mesh strainer, i.e., the liquid inlet pipe immersed in the liquid during rotation of the strainer. The clean backwash water may be discharged from the pump to be used as desired. In the embodiment described herein I show the discharge of the pump coupled with the clean water outlet line coming from the rotary strainer. I also provide scraper blades for scraping the accumulated solid matter from the mesh screens onto chutes for discharge outside of the reservoir tank.

Other details and advantages of this invention will become apparent as the following description of a present preferred embodiment thereof proceeds.

In the accompanying drawings, I have shown a present preferred embodiment of this invention in which:

FIG. 1 is a side elevation view of a backwash liquid strainer assembly coupled with a rotating drum strainer, the combination embodying one form of the present invention, and showing the discharge of the pump of the strainer assembly coupled to the line coming from the outlet of the drum strainer;

FIG. 2 is a plan view of the combination shown in FIG. 1;

FIG. 3 is a view taken along the line 3—3 of FIG. 1 and enlarged to better show the details of construction of the reservoir tank and strainer means forming part of the present invention;

FIG. 4 is a view taken along the line 4—4 of FIG. 3 showing further details of construction of certain of the elements forming part of the present invention;

FIG. 5 is a view taken along the line 5—5 of FIG. 1 showing some details of construction of the elements of the rotating drum strainers; and FIG. 6 is a plan view of a backwash liquid centrifuge solid-liquid separator assembly coupled with a rotating drum strainer, the combination embodying another form of the present invention, and showing the discharge of the pump of the separator assembly coupled to the line coming from the outlet of the drum strainer.

Referring now to the drawings, there is shown a backwash liquid strainer assembly 10 arranged with a high pressure, self-cleaning type rotating drum strainer 12. The drum strainer 12 is of any standard and well known design and includes a generally cylindrical housing 14 having a dirty liquid inlet 16 connected to a pipe 18 for transporting dirty water, for example, from a stream, river or lake to the strainer. A clean liquid outlet 20 is provided through housing 14 opposite to the inlet 16. Pipe 22 is connected to outlet 20 and extends to a discharge opening, not shown, where the clean liquid passing therethrough is to be used. A backwash liquid outlet 24 is provided through housing 14 at right angles to the inlet 16 and outlet 20. As shown in FIG. 5, a strainer drum 26 is arranged within housing 14 and is coupled with a motor 28, shown in FIGS. 1 and 2, for rotation about a vertical axis. There are numerous openings through the drum 26 into which are fitted strainer elements 30. Dirty liquid entering housing 14 passes through the strainer elements 30 and clean liquid is directed out of the housing 14 through outlet 20. As the drum 26 rotates, each vertical column of strainer elements 30 passes between a generally vertically extending slot 35 behind which is a backwash chamber 34. Liquid flows in a reverse direction (relative to dirty liquid flow) through the strainer elements 30 as they pass slot 35 into the backwash chamber 34 to thereby flush away the accumulated solids on the strainer elements. The solid laden backwash water is then discharged from the housing 14 through the backwash liquid outlet 24. All of the strainer elements 30 eventually pass across the backwash chamber 34 to be flushed clean.

The backwash liquid strainer assembly 10 includes an open top, four sided, generally rectangular cross-sectioned reservoir vessel or tank 40 for storing solid laden backwash liquid until such time as the liquid is ready to be strained. The reservoir tank 40 is connected to the backwash liquid outlet 24 of housing 14 through pipe 42 which is connected at one end to a lower portion of tank 40 and at the other end to a hand-operated valve 44 which in turn is connected to the backwash liquid outlet 24.

An open-ended hollow shaft member 50 is supported for rotation between two side walls of reservoir tank 40. A wire mesh strainer means 51 is fixed to an intermediate portion of the shaft member 50, and includes an annular support housing 52 having radially extending support ribs 54 fixed at the inner ends thereof to the shaft member 50 and flat support webs 56 arranged between pairs of ribs 54. Each of the webs 56 has a circular opening 57 through a mid-portion thereof; and extending from each opening 57 and fixed to each web 56 is a liquid inlet pipe 58, each of which communicates with an opening 62 through shaft member 50. Thus, the liquid inlet pipes 58 communicate with the interior of shaft member 50. Mesh wire screens are fixed to the open ends of annular housing 52, and surround portions of the shaft member 50. The size of the mesh of screens 64 is selected to preferably match that of the mesh of the strainer elements 30 of the drum 26 in the drum strainer 12. For example, if the strainer elements 30 have a 60 × 60 mesh, the screen 64 should likewise have a 60 × 60 mesh. In addition, the surface area of screens 64 should be preferably the same as the surface area of the strainer elements 30.

Each end portion of shaft member 50 extends beyond a side wall of the reservoir tank 40. A stub shaft 68 is force-fitted into the left end portion, as viewed in FIG. 4, of shaft member 50 and is secured to the shaft member as by welding between the stub shaft 68 and the end of the shaft member 50. Stub shaft 68 is supported for rotation at an intermediate portion thereof by bearing member 70 arranged on a ground supported pedestal 71, and is coupled through a speed reducer 72 to motor 74 which is connected with a source of electrical power, not shown. The right end portion of shaft member 50 is also supported for rotation by a bearing member 76.

A stationary hollow arbor 80 is disposed within shaft member 50 and has one end, the left end as viewed in FIG. 4, closed and the right end opened. An opening 82 extends radially through the arbor 80 to communicate with the interior thereof. Arbor 80 is oriented within shaft member 50 so that the axis of opening 82 is generally vertical and the opening 82 faces the bottom of tank 40. Opening 82 is located near the left end of the arbor 80 such that the axis thereof will be in the vertical plane including the axes of the opening 62 through shaft member 50. Thus, when shaft member 50 is rotated so that the axis on opening 62 is vertical and that opening 62 faces the bottom of tank 40, such opening 62 and the opening 82 through arbor 80 will be adjacent and coaxial, and a direct passage will exist between the confines of the tank 40 and the interior of arbor 80. A spring biased seal 84 is arranged in opening 82 to prevent leakage of air from around the arbor 80 into opening 82 during rotation of the strainer means when the interior of the arbor is under pump suction. Additional seals 86 and 88 are arranged between the interior of shaft member 50 and the left and right end portions, respectively, of arbor 80, for also preventing air from entering the arbor 80. An end cap 90 surrounding a portion of arbor 80 is fixed on the right end portion of shaft member 50 and serves to close the right end of the shaft member.

The right end of arbor 80 is fixed to a check valve 92 for permitting the liquid to flow only out of the arbor. The check valve 92 is coupled to a length of pipe 94 which, in turn, is coupled to the suction side of a centrifugal pump 96 which is driven by a motor 98 connected to a source of electrical power, not shown. The pressure or discharge port of the pump 96 is connected with a pipe 100 which in turn is joined to pipe 22 coming from the clean water outlet of the rotary drum strainer 12. Thus, the clean backwash water coming out of reservoir tank 40 will combine with the clean water stream discharged from the rotating drum strainer 12.

A pair of scraper units 102 is arranged in reservoir tank 40 for scraping the accumulated dewatered solid matter from the exterior of the screens 64 and for discharging the solid matter for collection outside of the tank. Each of the scraper blade units 102 includes a trough-like chute 104 arranged alongside a screen 64. Each chute 104 is cantilever supported by an end wall 40a of the reservoir tank 40, and is pitched downwardly from adjacent a point at an upper portion of the plane of a screen 64 to a discharge end disposed outwardly of the end wall 40a. Thus, solid matter falling into a chute 104 will tend to travel down the chute to be discharged onto the ground outside of the reservoir tank 40. A scraper blade 106 is fixed to the upper edge of the inside wall of each chute 104, and is positioned to rub against the surface of a screen 64, and thus scrape the accumulated solid from the screens as the strainer means 51 is rotated through tank 40. The scraper blades 106 are inclined toward the chutes 104 to thereby facilitate the flow of the solid waste into the chutes.

A float control 110 is supported by tank 40 at an upper portion thereof for activating the drive motor 74 of the strainer means 51 and motor 98 for pump 96 when the liquid in the tank 40 reaches a certain level. The float control 110 includes a float member extending into the confines of the tank 40, which member is connected with a switch. The switch is electrically connected to the motors 74 and 98. When the liquid in the tank 40 is below a certain level the switch is open and the motors are stopped; when the liquid in tank 40 reaches a certain level the float moves up to activate the switch and the motors start to thereby operate the strainer means 51 and pump 96. Thus, solid laden backwash liquid is drawn by pump 96 through the screens 64 to remove the solid matter, and the clean liquid is discharged into the clean liquid stream coming from the drum strainer 12.

Depending on the industry in which drum type self-cleaning strainers are used, and the nature of the solids in the liquid, the volume of backwash liquid will generally be between 1 and 5 percent of the total capacity of the strainer. The strainer capacities range anywhere from 50 gallons per minute to several thousand gallons per minute. This invention finds particular application to installations in operations using the higher capacity strainers. Many thousands of gallons per day of backwash liquid are therefore to be dealt with, and at a backwash volume of 5 percent the removable solids carried in 1,000 gallons of unstrained liquid are concentrated in 50 gallons of backwash liquid and with a backwash ratio of 1 percent the removable solids are concentrated from 1,000 gallons to 10 gallons. The high capacity high pressure drum type self-cleaning strainers must be of heavy rugged construction designed for low pressure drop, and would not be suitable for use in straining the relatively low volume of backwash liquid. On the other hand, rotating screen type strainers, such as strainer assembly 10, are low volume, low velocity, and low pressure type strainers which would be entirely unsuited for drum type strainer application, but which are eminently satisfactory straining backwash liquid at low volumes and a high pressure drops.

FIG. 6 shows another embodiment of the present invention. In this embodiment a low pressure centrifugal liquid-solid separator 130 is used for separating the solids from the liquids of the backwash liquid discharged from the rotating drum strainer 12. The backwash liquid outlet 24 of strainer 12 is coupled to a reservoir vessel 132 through piping 134 having a hand operating valve 136 therein. Piping 138 is coupled between vessel 132 and the hollow inlet pipe 140 of separator 130. The centrifugal separator 130 is shown more or less schematically since it represents any well-known separator, and, as such, forms no part of the present invention. Separator 130 is supported for rotation by a pair of axially arranged shafts 142 and 144, respectively, shaft 142 being hollow and surrounding inlet pipe 140. A drive sheave 146 is shown fixed to shaft 140 which sheave is coupled to a drive motor 147. The inlet pipe 140 extends to and communicates with the interior of centrifugal impellar 150 which includes the usual continuous scroll-type blade 151. The impeller 150 is surrounded by a housing 152 having a sludge discharge 154 at the left end thereof, as viewed in FIG. 6, and a clean liquid discharge 156 at the right end thereof. The clean liquid discharge 156 is coupled by piping 158 to the suction side of suction pump 160. The discharge of pump 160, in turn, is coupled by piping 162 to the outlet pipe 22 of drum strainer 12. Thus, the pump 160 draws liquid from vessel 132 through inlet pipe 140, into the confines of impellar 150 out of openings 164, into engagement with blade 151 where the solids are separated from the liquid and the clean liquid is drawn through the pump 160 and discharged into outlet pipe 22. The solid sludge will be urged by the impellar blade 151 out of sludge discharge 154. As in the earlier embodiment, the pump and separator motors may be arranged to begin operating simultaneously when the level of liquid in vessel 132 reaches a prescribed point. SImilarly, the motors will be set to stop when the level of liquid in vessel 132 drops below a certain point, not necessarily the same as the pump and separator starting level. The size of the separator 130 should be selected so that the degree of separation of solids from the liquids passing therethrough is at least equivalent to the straining capacity of rotating drum strainer 12. For example, if the strainer elements 30 of strainer 12 are sized to strain a certain size particle, then separator 130 should also be able to separate that same size particle.

It should be apparent to those skilled in the art that various other arrangements of the elements comprising the combination of this invention are possible. For example, the strainer means 51 can be made in various other forms well known in the strainer art; the scraper means 102 may be substituted by a flush system, etc.

I claim:

1. A plant for processing of liquids having solids therein comprising the combination of:
   an automatic self-cleaning strainer including a rotatable drum arranged in a housing with a plurality of strainer elements disposed in openings through the drum, liquid inlet means arranged to receive pressurized liquid for directing the liquid to flow through such strainers, liquid outlet means for receiving the strained pressurized liquid to discharge same from the housing, backwash liquid means including a backwash chamber open to atmospheric pressure and a slot open to said strainer elements as they are rotated past the chamber whereby pressurized clean liquid will flow through the strainer elements to force accumulated solid matter on the strainer elements into the backwash chamber, and backwash liquid outlet means for receiving and discharging solid laden backwash liquid from said housing;
   a backwash liquid strainer assembly comprising:
     a reservoir tank communicating with the backwash liquid outlet means;
     low pressure liquid-solid separating means including a liquid inlet communicating with the interior of said tank, for separating the solids from the liquids stored in said tank,
     suction means extending from the exterior of said tank to said separating means for drawing liquid through said separating means and discharging clean liquid externally of said tank; and
     means for discharging solid sludge from said reservoir tank.

2. The combination as set forth in claim 1 wherein said separating means is a rotating drum strainer means supported by said tank and including a liquid inlet communicating with the interior of said tank for straining liquid in the tank; and wherein said suction means extends from the exterior of said tank to the liquid inlet of said drum strainer means for drawing liquid from said tank through said strainer means and discharging liquid externally of said tank.

3. The combination as set forth in claim 1 wherein said separating means is a centrifuge means having an inlet communicating with the interior of said tank; and wherein said suction means is coupled with the discharge of said centrifuge means.

4. The combination as set forth in claim 2 wherein said suction means communicates with the liquid outlet means of the rotating drum strainer for discharging clean liquid into the liquid outlet means.

5. The combination as set forth in claim 2 including cleaning means supported by said tank for cleaning accumulated solid matter from said strainer means.

6. The combination as set forth in claim 2 wherein said strainer means includes a disc-shaped mesh strainer supported by said tank for rotation about the axis thereof, and power means for driving said mesh strainer; and wherein the said suction means includes hollow piping extending along the axis of said mesh strainer.

7. The combination as set forth in claim 6 wherein said suction means includes a pump connected with said hollow piping, and drive means for driving said pump; and including control means in said tank operatively connected with said power and drive means and responsive to the level of liquid in said tank for operating said power and drive means when the liquid in said tank reaches a certain level.

8. A plant for processing of liquids having solids therein comprising the combination of:
   an automatic self-cleaning strainer including a rotatable drum arranged in a housing with a plurality of strainer elements disposed in openings through the drum, liquid inlet means arranged to receive pressurized liquid for directing the liquid to flow through said strainers, liquid outlet means for receiving the strainer pressurized liquid to discharge same from the housing, backwash liquid means including a backwash chamber open to atmospheric pressure and a slot open to said strainer elements as they are rotated past the chamber whereby pressurized clean liquid will flow through the strainer elements to force accumulated solid matter on the strainer elements into the backwash chamber, and backwash liquid outlet means for receiving and discharging solid laden backwash liquid from said housing;
   a backwash liquid strainer assembly comprising:
     a reservoir tank communicating with the backwash liquid outlet means;
     disc-shaped mesh low pressure rotating drum strainer means supported by said tank for rotation about the axis thereof lying in a generally horizontal plane and sized such that a substantial portion thereof is within the confines of said tank;
     said drum strainer means including a liquid inlet communicating with the interior of said tank;
     power means coupled with said drum strainer means for driving said drum strainer means;
     suction means extending from the exterior of said tank to said liquid inlet of said drum strainer for drawing liquid from said tank through said drum strainer and discharging clean liquid externally of said tank; and
     scraper means supported by said tank for scraping solid matter from said drum strainer and discharging same externally from said tank.

9. The combination as set forth in claim 8 wherein said drum strainer means includes an elongated hollow shaft member extending across an intermediate portion of said tank; an open-ended annular support housing fixed to said shaft member; screen members fixed to the end peripheries of said support housing; said liquid inlet of said drum strainer means is arranged between said screen members and communicating with the interior of said shaft: and wherein said suction means includes hollow piping extending into said shaft member to communicate with said liquid inlet of said drum strainer means.

10. The combination as set forth in claim 9 wherein said liquid inlet of said drum strainer means includes a plurality of arcuately spaced inlet pipes extending radially from said shaft member and communicating with the interior thereof; and including valve means in said hollow piping for opening said piping to one of said inlet pipes during rotation of said shaft and admitting liquid into said piping.

11. The combination as set forth in claim 9 wherein said suction means includes a pump having inlet and discharge ports; drive means for driving said pump; and including control means in said tank operatively connected with said power and drive means and responsive to the level of liquid in said tank for operating said power and drive means when liquid in said tank reaches a certain level.

12. The combination as set forth in claim 11 including piping means coupling the discharge port of said pump to the liquid outlet means of said self-cleaning strainer.

* * * * *